United States Patent
Kim et al.

(10) Patent No.: US 8,280,391 B2
(45) Date of Patent: Oct. 2, 2012

(54) METHOD AND APPARATUS FOR IDENTIFYING DOWNLINK MESSAGE RESPONSIVE TO RANDOM ACCESS PREAMBLES TRANSMITTED IN DIFFERENT UPLINK CHANNELS IN MOBILE COMMUNICATION SYSTEM SUPPORTING CARRIER AGGREGATION

(75) Inventors: Sang-Bum Kim, Seoul (KR);
Kyeong-In Jeong, Hwaseong-si (KR);
Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 12/545,355

(22) Filed: Aug. 21, 2009

(65) Prior Publication Data
US 2011/0045837 A1      Feb. 24, 2011

(51) Int. Cl.
*H04W 72/00*      (2009.01)

(52) U.S. Cl. .................... 455/452.1; 455/455; 370/329; 370/330; 370/341

(58) Field of Classification Search ............... 455/452.1
See application file for complete search history.

(56) References Cited

U.S. PATENT DOCUMENTS

| | | | |
|---|---|---|---|
| 2004/0219926 A1* | 11/2004 | Kim et al. ............. | 455/452.2 |
| 2010/0296467 A1* | 11/2010 | Pelletier et al. ........ | 370/329 |
| 2011/0038271 A1* | 2/2011 | Shin et al. ............. | 370/252 |
| 2011/0096735 A1* | 4/2011 | Damnjanovic et al. .. | 370/329 |
| 2012/0044897 A1* | 2/2012 | Wager et al. ........... | 370/329 |

* cited by examiner

*Primary Examiner* — Charles Appiah
*Assistant Examiner* — Mazda Sabouri
(74) *Attorney, Agent, or Firm* — Jefferson IP Law, LLP

(57) ABSTRACT

An apparatus and method for determining an uplink channel used for a random access procedure are provided. An exemplary method by a User Equipment (UE) includes transmitting a preamble to a Base Station (BS) on at least one channel of a plurality of channels, receiving a response from the BS, and distinguishing the response based on an identifier unique to a channel resource to identify the channel in which the preamble is transmitted.

22 Claims, 10 Drawing Sheets

METHOD AND APPARATUS FOR IDENTIFYING DOWNLINK MESSAGE RESPONSIVE TO RANDOM ACCESS PREAMBLES TRANSMITTED IN DIFFERENT UPLINK CHANNELS IN MOBILE COMMUNICATION SYSTEM SUPPORTING CARRIER AGGREGATION

BACKGROUND OF THE INVENTION

1. Field of the Invention

The present invention relates to a mobile communication system supporting asymmetric Carrier Aggregation (CA). More particularly, the present invention relates to a method for discriminating messages received in response to random access preambles transmitted in different uplink channels.

2. Description of the Related Art

Mobile communication technologies have been developed to provide communication services on the move. With the rapid advance of the mobile communication technologies, a high speed data communication service is becoming a basic communication service in addition to a voice communication service.

The 3rd Generation Partnership Project (3GPP), which is responsible for the standardization of Universal Mobile Telecommunications System (UMTS), is working to significantly expand the performance of UMTS by developing a Long Term Evolution (LTE) system. LTE is a 3GPP standard that is being developed to allow a downlink speed of up to 100 Mbps, and its commercial deployment is expected by 2010. In order to fulfill the requirements for the LTE systems, studies have been done in various aspects, e.g., reduction of the number of involved nodes in connections and placing radio protocols as close as possible to radio channels.

As the work on the LTE approaches its completion, activities on a further evolution of LTE are beginning to take shape within 3GPP. With the initiation of LTE-Advanced (LTE-A), several technology components are being discussed. Among them, Carrier Aggregation (CA) is a technology to increase bandwidth by aggregating multiple carriers. The CA technology can be divided into two categories according to the number of uplink and downlink channels allocated to each user: symmetric and asymmetric CAs. In the symmetric CA, the number of allocated uplink channels is the same as the number of allocated downlink channels. For instance, an uplink-downlink allocated channel ratio of 2:2, 5:5 or any symmetric ratio of x:x can be adopted for a symmetric CA. On the other hand, asymmetric CA is implemented using an uplink-downlink allocated channel ratio such as 1:2, 3:1 or any asymmetric ratio x:y.

FIG. 1 is a diagram illustrating an asymmetric CA system having an allocated uplink-downlink channel ratio of 2:1 according to a related art.

Referring to FIG. 1, a base station uses one downlink channel 105 for transmission to a User Equipment (UE), whereas the UE uses two uplink channels 110 and 115 for transmission to the base station.

In order to support CA, the UE is required to perform several operations. One of them is a random access procedure. A random access procedure is typically performed when a UE awakes from a sleep mode, performs a handover from one cell to another or when it loses uplink timing synchronization. More specifically, the random access procedure allows the UE to acquire uplink timing synchronization which allows it to send uplink scheduling or a resource request.

FIG. 2 is a sequence diagram illustrating a random access procedure between an Enhanced Node B (ENB) and a UE in an LTE system according to a related art.

Referring to FIG. 2, a UE 205 desires service within a cell controlled by an ENB 210. As part of the service acquisition, the UE 205 accesses the cell to perform a random access procedure via a Random Access CHannel (RACH). In step 215, the UE 205 receives system information, related to the random access procedure, broadcasted within the cell by the ENB 210. The system information from the ENB 210 includes groups of random access preambles and sets of available access preambles in each group (i.e., a range of preamble IDentifiers (IDs) belonging to an RACH preamble group A, a range of preamble IDs belonging to an RACH preamble group B), a threshold value (THRES) of the size of a message to be transmitted by the UE 205, and offset information (OFFSET) indicating channel status. It is noted that these parameters are specified in 3GPP Technical Specification 36.331 V8.5.0, the entire disclosure of which is hereby incorporated by reference.

If a preamble group and a preamble are selected, the UE 205 transmits a Random Access Preamble (RAP) indicating the selected preamble group and preamble to the ENB 210 in step 220. Upon receipt of the RAP, the ENB 210 transmits a Random Access Response (RAR) message to the UE 205 in step 225. The RAR message contains a Random Access Preamble ID (RAPID), Timing Adjustment (TA) for compensating uplink timing, uplink resource allocation information (UL grant) for scheduled uplink transmission of the UE 205, and a Temporary Cell Radio Network Temporary Identifier (Temporary C-RNTI). The RAR message can carry such information for multiple RAPs. That is, the RAR message can contain multiple RAPIDs, TAs, UL grants, and Temporary C-RNTIs.

The RAR message is transmitted on a Physical Downlink Shared CHannel (PDSCH) and the location of the RAR message in the PDSCH is transmitted on a Physical Downlink Control Channel (PDCCH). The PDCCH includes a payload and a 16-bit Cyclic Redundancy Check (CRC) scrambled with a Radio Network Temporary Identifier (RNTI). The RNTI used in the random access procedure is called a Random Access-RNTI (RA-RNTI). The RA-RNTI is determined based on the time-frequency resource allocation of the RACH used for transmitting the RAP. The RA-RNTI is used on the PDCCH when the RAR messages are transmitted. It unambiguously identifies which time-frequency resource was utilized by the UE to transmit the RAP and thus is used by the UE to decode the PDCCH message containing its assigned information from the ENB. More specifically, the RA-RNTI is determined according to Equation (1):

$$\text{RA-RNTI}=1+t\_id+10*f\_id \qquad (1)$$

where t_id denotes a time index of a resource element in a Physical Random Access Channel (PRACH) in the range of $0 \leq t\_id < 10$, and f_id denotes a frequency index of a resource element in the PRACH in the range of $0 \leq f\_id < 6$. The PRACH is a physical channel for carrying the RAP.

To acquire the resource allocation information from the RAR message, the UE 205 performs blind decoding on received PDCCHs using the RA-RNTI. That is, to decode the payload of the PDCCH assigned to the UE 205 by the ENB 210, the UE 205 uses its associated RA-RNTI on all PDCCHs. Accordingly, if a specific PDCCH can be decoded with the RA-RNTI associated with the UE 205, then the PDCCH is destined for the UE 205. If the UE 205 successfully decodes a specific PDCCH using the RA-RNTI associated with the RACH resource used for transmitting its RAP, the UE 205 is able to locate the radio resource information contained in the RAR message on the basis of the decoded PDCCH information. The UE 205 identifies resource information assigned by the ENB 210 by detecting an associated RAPID. Using the allocated resource information from the RAR message, the UE 205 can perform an uplink scheduling transmission or resource request transmission in step 230.

If multiple UEs have transmitted the same RAPs at step 220, the RAPs collide with each other. In this case, the ENB 210 transmits to the UE 205 a Contention Resolution message in step 235, informing of which UE's transmission is successfully received. The Contention Resolution message includes a System Architecture Evolution (SAE) Temporary Mobile Station Identifier (S-TMSI) received at step 230 or a random number. Each UE that received the Contention Resolution message determines whether the S-TMSI or the random number contained in the Contention Resolution message is identical with the one it transmitted at step 230. If the received S-TMSI or random number is identical with the transmitted S-TMSI or random number, the corresponding UE continues the random access procedure and, otherwise, restarts the random procedure.

In an asymmetric CA system as illustrated in FIG. 1, a problem may arise when performing a random access procedure. Specifically, the UE may transmit RAPs through both the uplink channel 110 and the uplink channel 115. Since the ENB transmits the RAR messages through only the one downlink channel 105 in response to the two RAPs, the UE must discriminate which RAR message is responsive to which of the two RAPs. However, according to the prior art, the UE would have the same RA-RNTI for both RAPs. Therefore, a need exists for a system and method that allows a UE to discriminate RAR messages responsive to RAPs transmitted in the different uplink channels.

SUMMARY OF THE INVENTION

An aspect of the present invention is to address at least the above-mentioned problems and/or disadvantages and to provide at least the advantages described below. Accordingly, an aspect of the present invention is to provide an apparatus and method for identifying downlink messages responsive to random access preambles transmitted in different uplink channels.

In accordance with an aspect of the present invention, a method for performing random access by a User Equipment (UE) is provided. The method includes transmitting a preamble to a Base Station (BS) on at least one channel of a plurality of channels, receiving a response from the BS, and distinguishing the response based on an identifier unique to a channel resource to identify the channel in which the preamble is transmitted.

In accordance with another aspect of the present invention, a method for performing random access by a BS is provided. The method includes receiving a preamble transmitted from a UE on at least one channel of a plurality of channels, generating a response based on an identifier unique to a channel resource for identifying the channel in which the preamble is transmitted, and transmitting the response to the UE.

In accordance with still another aspect of the present invention, an apparatus of a UE for performing random access is provided. The apparatus comprises a transceiver for transmitting a preamble to a BS on at least one channel of a plurality of channels, and for receiving a response from the BS, and a message analyzer for distinguishing the response based on an identifier unique to a channel resource to identify the channel in which the preamble is transmitted.

In accordance with yet another aspect of the present invention, an apparatus of a BS for performing random access is provided. The apparatus includes a transceiver for receiving a preamble transmitted from a UE on at least one channel of a plurality of channels, and for transmitting a response to the UE, and a message analyzer for generating the response based on an identifier unique to a channel resource for identifying the channel in which the preamble is transmitted.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to a method for discriminating Random Access Response (RAR) messages responsive to different Random Access Preambles (RAPs) in a mobile communication system supporting asymmetric Carrier Aggregation (CA). In order to discriminate the downlink RAR messages responsive to RAPs transmitted in different uplink channels, a method and apparatus for identifying the preamble transmission channel in accordance with the present invention comprises an extended Random Access-Radio Network Temporary Identifier (RA-RNTI) or a separate identifier in the RAR message.

Figure 1:
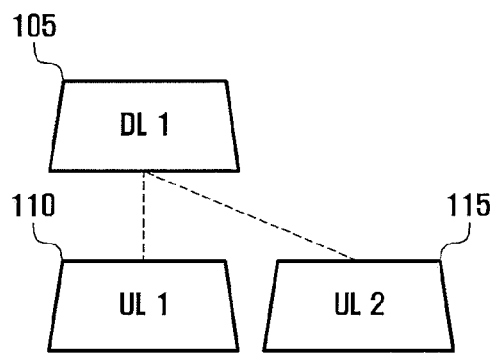
FIG. 1 is a diagram illustrating an asymmetric Carrier Aggregation (CA) system having an allocated uplink-downlink channel ratio of 2:1 according to a related art.
Figure 2:
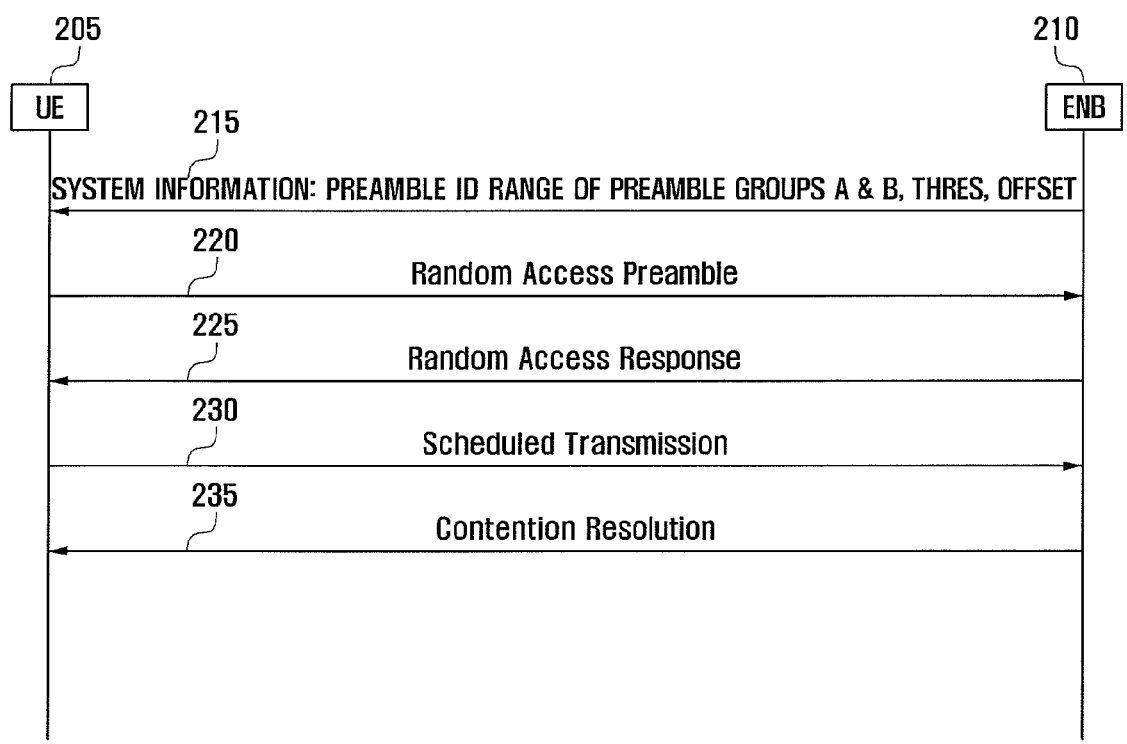
FIG. 2 is a sequence diagram illustrating a random access procedure between an Enhanced Node B (ENB) and a User Equipment (UE) in a Long Term Evolution (LTE) system according to a related art.

As discussed above, if the CA technology is adopted in a Long Term Evolution-Advanced (LTE-A) system, an asymmetric CA can be implemented as shown in FIG. 1. In this case, the use of the above described random access procedure of the LTE system is likely to cause problems in the CA-based mobile communication system. Taking the asymmetric CA as shown in FIG. 1 into account, the User Equipment (UE) can transmit an RAP through the uplink channel 110 and can transmit an RAP through the uplink channel 115. However, the Enhanced Node B (ENB) transmits two RAR messages through only a single downlink channel 105. In order for the UE to distinguish the RAR messages received in response to multiple RAPs, the exemplary embodiments of the present invention enable the UE to distinguish between the RAR messages responsive to a plurality of RAPs transmitted through a plurality of uplink channels by using an extended RA-RNTI or including a new identifier according to the present invention in the RAR message. Exemplary methods for discriminating downlink messages responsive to preambles transmitted through different uplink channels are described in more detail.

In the following examples, two uplink channels and one downlink channel are described. However, it is to be understood that this is merely for convenience and not to be construed as limiting. That is, the present invention is applicable to asymmetric CA systems using any number of uplink and downlink channels. Furthermore, certain examples below indicate a choice of a specific uplink channel, such as a first or a second uplink channel, for transmission of an RAP. However, this is also merely for convenience of description and not to be construed as limiting.

First Exemplary Embodiment

In a first exemplary embodiment of the present invention, an identifier for identifying the uplink channel in which the RAP was transmitted is introduced in an equation for determining the RA-RNTI. For example, whether an RAR message is responsive to a first uplink channel or a second uplink channel is determined using a Cyclic Redundancy Check (CRC) scrambled by RA-RNTI. The extended RA-RNTI can be expressed as Equation (2):

$$\text{RA-RNTI} = 1 + t\_id + 10 * f\_id + N * UL\ CC\_ID \quad (2)$$

where UL CC_id denotes an uplink channel index indicating a corresponding uplink channel, t_id denotes a time index of a resource element allocation block in a Physical Random Access Channel (PRACH) in the range of $0 \leq t\_id < 10$, and f_id denotes a frequency index of a resource element allocation block in a PRACH in the range of $0 \leq f\_id < 6$. The PRACH is a physical channel for carrying the RAP. The UL CC_id is selected in the range of $0 \leq UL\ CC\_id < max\_configured\_UL\_CCs$. Here, the max_configured_UL_CCs denotes the maximum number of uplink channels. N is set to a total number of resource element for a uplink channel. For instance, assuming $0 \leq t\_id < 10$ and $0 \leq f\_id < 6$, N is equal to 60. It is to be understood that the ranges specified above for t_id and f_id are only for purposes of explanation and are not intended to be limiting.

Figure 3:
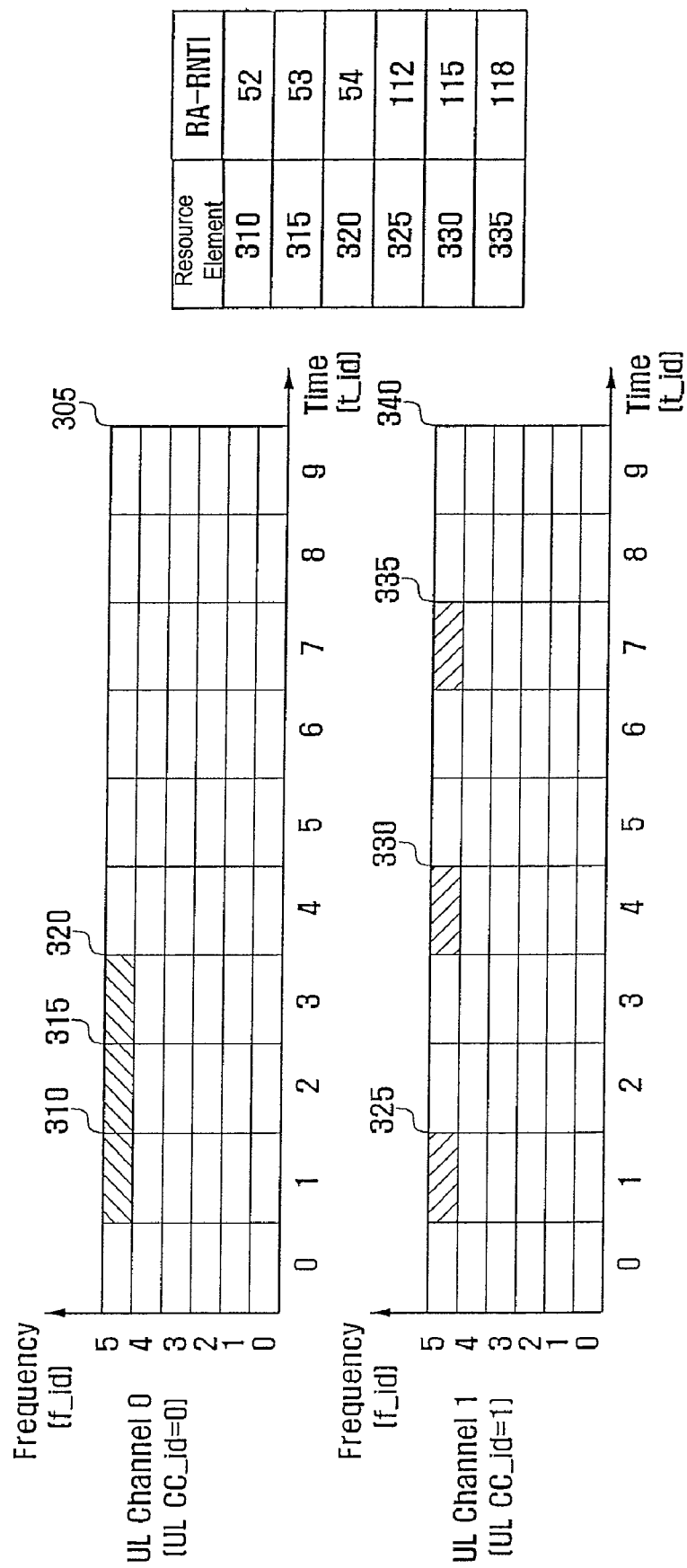
FIG. 3 is a diagram illustrating a process for determining a Random Access-Radio Network Temporary Identifier (RA-RNTI) in a message discrimination method according to an exemplary embodiment of the present invention.

FIG. 3 is a diagram illustrating a process for determining an RA-RNTI in a message discrimination method according to an exemplary embodiment of the present invention.

Referring to FIG. 3, reference numbers 305 and 340 denote the given resources of first and second uplink channels, respectively. Each resource is defined in the frequency domain and the time domain such that allocated resource information can be identified using t_id on the time axis and f_id on the frequency axis. For example, if an RAP is transmitted on resource element 310, it can be identified using Equation (2) and its associated parameters. More particularly, resource element 310 has associated parameters of t_id=1 and f_id=5. Furthermore, the resource element 310 is transmitted on a first uplink channel (UL Channel 0) so that UL CC_id=0. Also, the total number of cases of t_id (10) and f_id (6) is 60 so that N=60. Using these variables in Equation (2) yields an RA-RNTI of 52. Similarly, RAPs transmitted on the resource elements 315 and 320 (i.e., (t_id, f_id)=(2, 5) and (3, 5)) of the first uplink channel (UL Channel 0) with N=60 and UL CC_id=0 have RA-RNTIs of 53 and 54.

In the same manner, an RAP may be transmitted on resource element 325. Similar to the above described case of resource element 310, resource element 325 has associated parameters of t_id=1 and f_id=5 and is transmitted on a channel having a total of 60 cases of t_id and f_id so that N=60. However, the resource element 325 is transmitted on a second uplink channel (UL Channel 1) so that UL CC_id=1. Using these variables in Equation (2) yields an RA-RNTI of 112. Similarly, the RA-RNTIs of the uplink preambles transmitted on the resource elements 330 and 335 of the second uplink channel become 115 and 118. In case of using Equation (1), the same RA-RNTIs would have been determined for the resource elements 310 and 325, such that the RARs transmitted with respect to the resource elements 310 and 325 cannot be distinguished. However, in an exemplary embodiment of the present invention, since the RA-RNTIs carried on the different uplink channels are determined without duplication using Equation (2), the UE can decode the PDCCHs carrying the resource allocation information for respective RAR messages distinctively.

Figure 4:
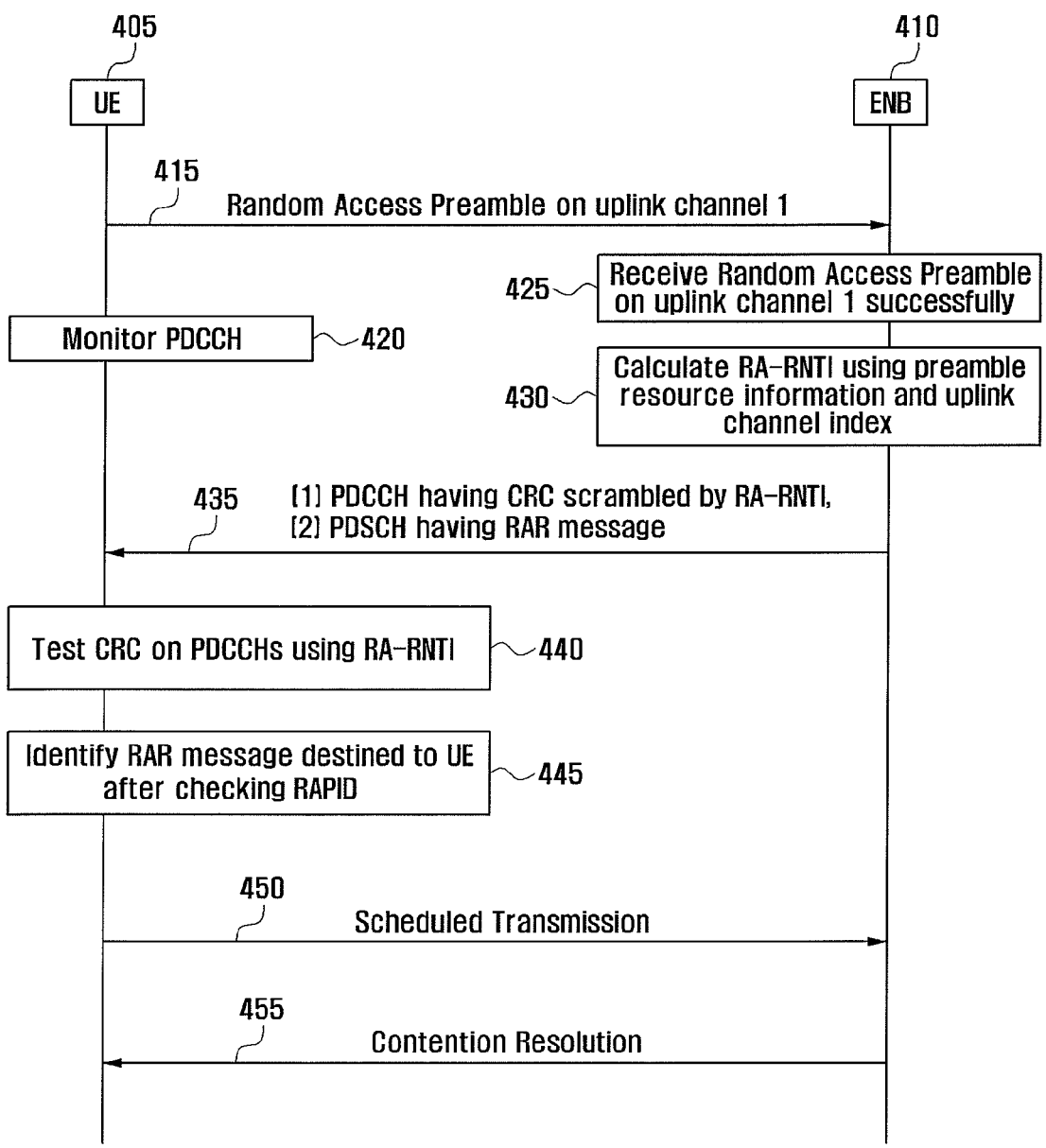
FIG. 4 is a sequence diagram illustrating operations of an ENB and a UE for a random access procedure according to a first exemplary embodiment of the present invention.

FIG. 4 is a sequence diagram illustrating operations of an ENB and a UE for a random access procedure according to a first exemplary embodiment of the present invention.

Referring to FIG. 4, a UE 405 that can use multiple uplink channels in an asymmetric Carrier Aggregation (CA) system has selected a first uplink channel (i.e., uplink channel 1) on which to transmit an RAP to an ENB 410 in step 415. In step 425, the ENB 410 determines if the RAP is received successfully. If it is determined that the RAP is received successfully in step 425, the ENB 410 determines an RA-RNTI with Equation (2) using the variables associated with the resource element on which the RAP is transmitted including the channel index of the uplink channel 1 (i.e., UL CC_id=1) in step 430. Next, the ENB 410 transmits the PDCCH which includes the payload that contains resource information for the RAR message and CRC scrambled by the RA-RNTI which is followed by the RAR message in step 435. In the meantime, the UE 405 monitors to receive the PDCCHs in step 420 after transmitting the RAP. If PDCCHs are received, the UE 405 performs CRC decoding on the PDCCHs using the RA-RNTI and attempts to receive the RAR message in step 440. Next, the UE 405 identifies the RAR message assigned to it by the ENB 410 using the RAPID in step 445. As a consequence, the UE 405 performs a scheduled transmission in step 450 and receives a contention resolution message transmitted by the ENB 410 in step 455 as aforementioned.

Figure 5:
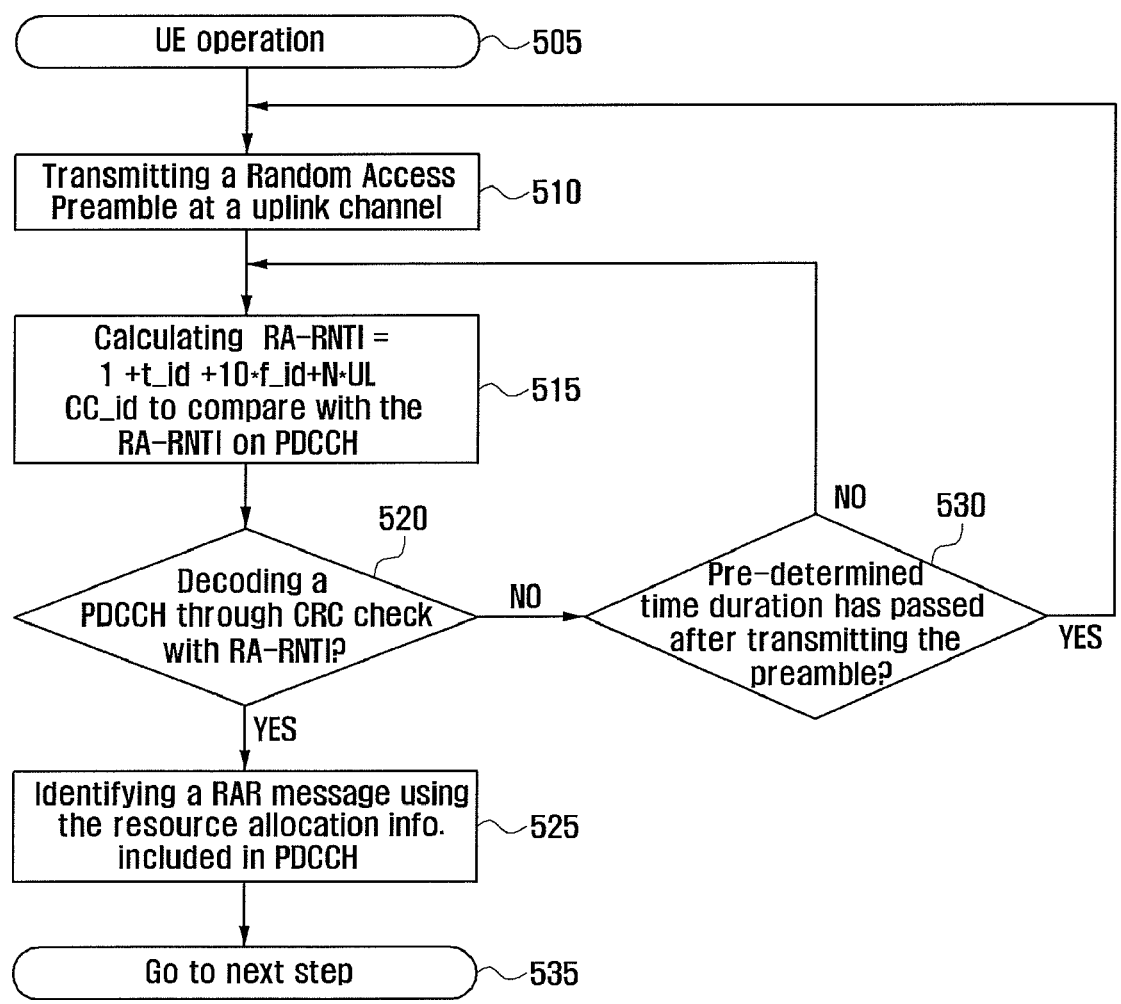
FIG. 5 is a flowchart illustrating a random access procedure at a UE according to the first exemplary embodiment of the present invention.

FIG. 5 is a flowchart illustrating a random access procedure at a UE according to the first exemplary embodiment of the present invention.

Referring to FIG. 5, the UE awakes from a sleep mode or otherwise operates in a state in which it requires to execute a random access procedure in step 505. The UE transmits an RAP on an uplink channel in step 510 and determines an RA-RNTI using Equation (2) for blind decoding in step 515. In step 520, the UE determines whether a PDCCH is decoded through CRC using the RA-RNTI. If a PDCCH is decoded with the RA-RNTI successfully, the UE receives the RAR message indicated by the resource allocation information carried by the PDCCH in step 525. If no PDCCH is decoded with the RA-RNTI, in step 530 the UE waits for a predetermined time duration after transmission of the RAP and determines whether to repeat transmission of the RAP or re-determine the RA-RNTI and continue decoding PDCCHs. For instance, if three frame times after transmission of the RAP or a specific time window have passed, the UE returns to step 510 and retransmits the RAP. Otherwise, the UE returns to step 515 where it re-determines the RA-RNTI and continues monitoring for receipt of an appropriate PDCCH. Referring again to step 525, after the RAR message is received, the UE proceeds to step 535 where it performs a next appropriate step, such as a scheduled transmission.

Figure 6:
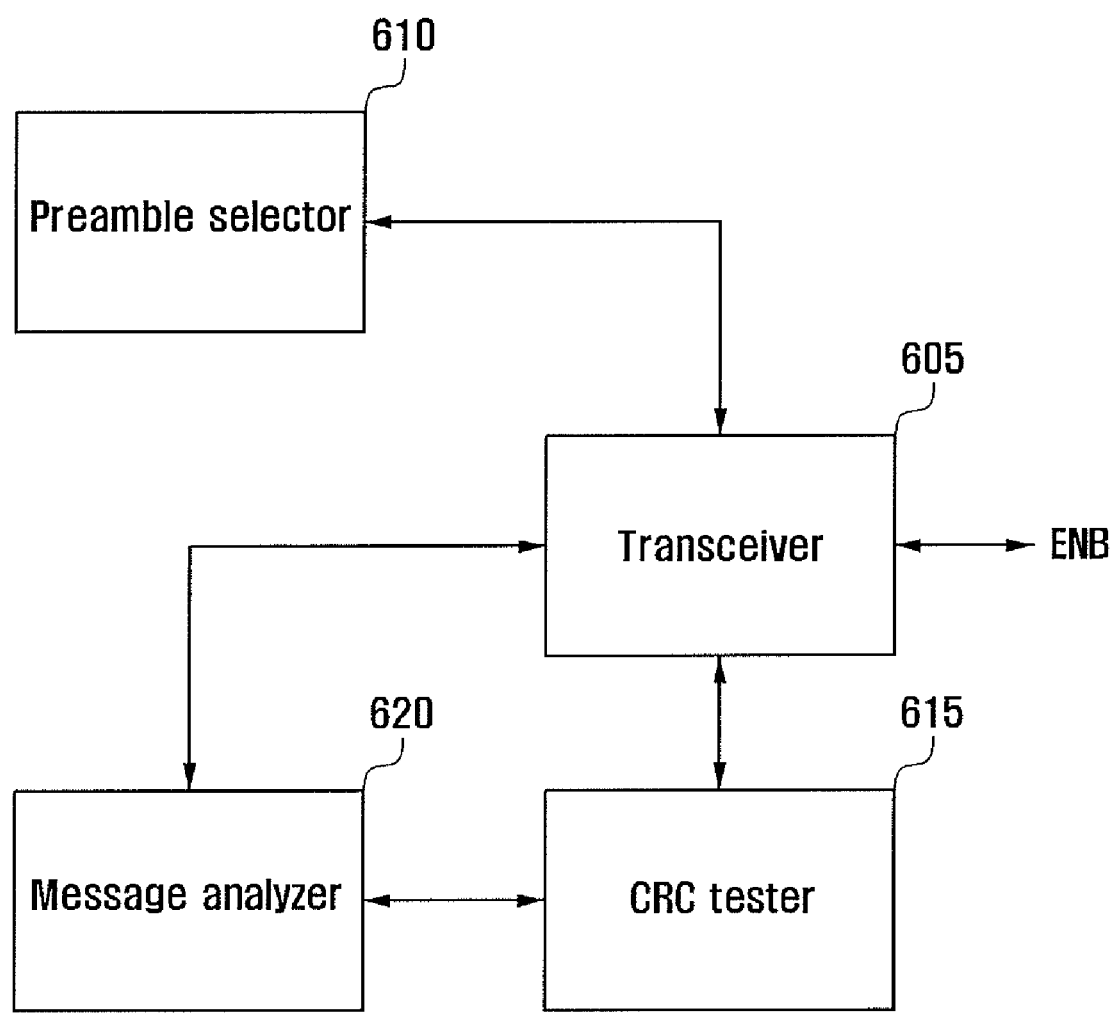
FIG. 6 is a diagram illustrating a configuration of a UE according to the first exemplary embodiment of the present invention.

FIG. 6 is a diagram illustrating a configuration of a UE according to the first exemplary embodiment of the present invention.

Referring to FIG. 6, the UE includes a transceiver 605, a preamble selector 610, a CRC tester 615 and a message analyzer 620. The transceiver 605 is responsible for radio communications to and from an ENB and, more particularly, transmits an RAP selected by a preamble selector 610. The UE receives PDCCHs transmitted by the ENB by means of the transceiver 605 and determines, by means of the message analyzer 620, whether an RAR message assigned by the ENB has been received. That is, the message analyzer 620 determines if there exists an RAR message assigned to the UE by the ENB by coordinating with the CRC tester 615 to blind decode PDCCHs using the RA-RNTI. More particularly, the message analyzer 620 determines the RA-RNTI using Equation (2), and provides the RA-RNTI to the CRC tester 615 for decoding. The CRC tester 615 determines if the PDCCH can be decoded using the determined RA-RNTI. If the RA-RNTI of the PDCCH is identical with the determined RA-RNTI, the message analyzer 620 receives the RAR message addressed by the RA-RNTI and analyzes the information carried by the RAR message.

Figure 7:
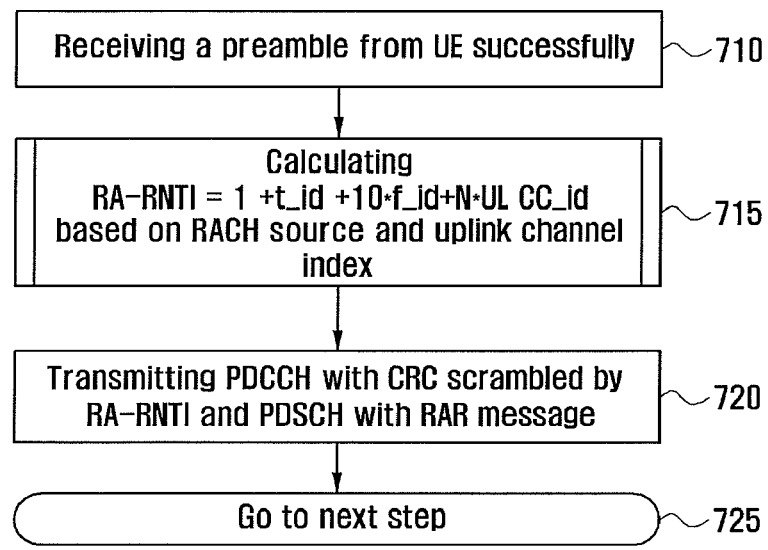
FIG. 7 is a flowchart illustrating a random access procedure at an ENB according to the first exemplary embodiment of the present invention.

FIG. 7 is a flowchart illustrating a random access procedure at an ENB according to the first exemplary embodiment of the present invention.

Referring to FIG. 7, the ENB successfully receives an RAP transmitted by the UE in step 710. In step 715, the ENB determines an RA-RNTI using Equation (2) which includes the channel index indicating the uplink channel through which the RAP has been transmitted. In step 720, the ENB transmits a PDCCH including a payload and CRC scrambled by the determined RA-RNTI. In step 725, the ENB proceeds with an appropriate next step such as providing a resource to the UE.

Figure 8:
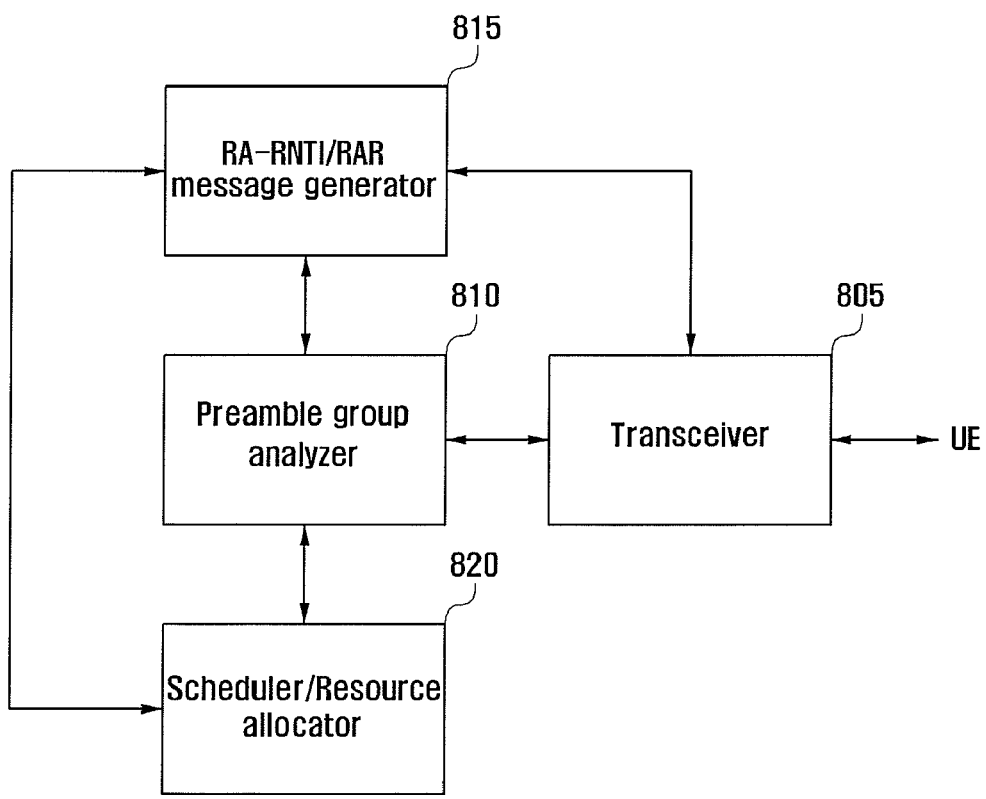
FIG. 8 is a diagram illustrating a configuration of an ENB according to the first exemplary embodiment of the present invention.

FIG. 8 is a diagram illustrating a configuration of an ENB according to the first exemplary embodiment of the present invention.

Referring to FIG. 8, the ENB includes a transceiver 805, a preamble group analyzer 810, an RA-RNTI/RAR message generator 815 and a scheduler/resource allocator 820. The transceiver 805 is responsible for radio communication with a UE and, more particularly, receives an RAP transmitted by the UE. The preamble group analyzer 810 analyzes the RAP received by the transceiver 805. The scheduler/resource allocator 820 allocates different resources according to the group to which the preamble belongs. The RA-RNTI/RAR message generator 815 generates an RA-RNTI using the resource element information used for transmission of the RAP including the uplink channel index with Equation (2) and outputs the RA-RNTI to the transceiver 805. The transceiver 805 scrambles a CRC with the RA-RNTI received from the RA-RNTI/RAR message generator 815 and transmits the PDCCH containing the payload and CRC to the UE. The RA-RNTI/RAR message generator 815 also generates an RAR message which is transmitted to the UE on the resource indicated by the PDCCH.

Second Exemplary Embodiment

In a second exemplary embodiment of the present invention, a channel identifier is included in an RAR message for indicating which uplink channel the RAR message is responding to, for example if the RAR is responsive to an RAP transmitted through an uplink channel 1 or uplink channel 2.

Figure 9:
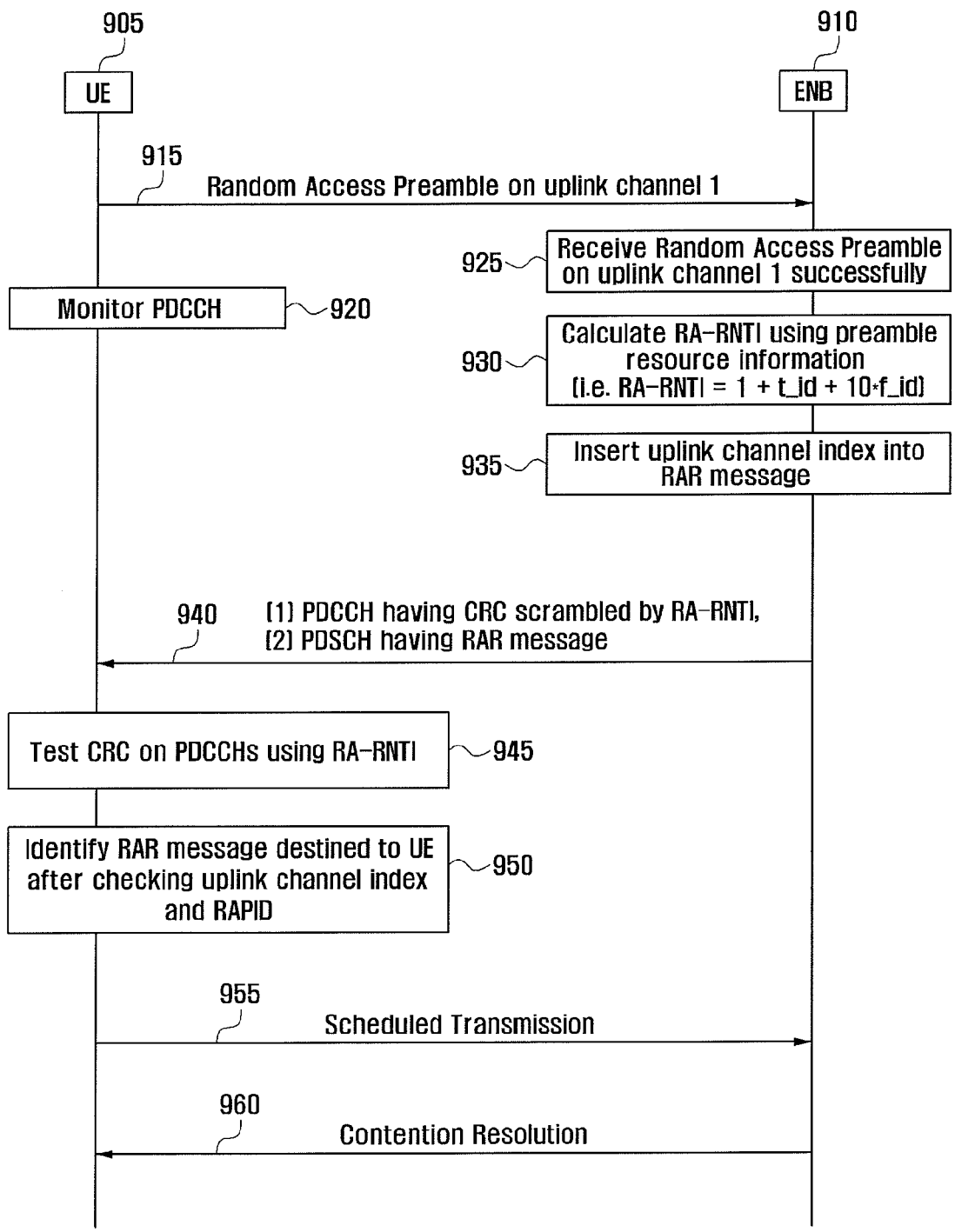
FIG. 9 is a sequence diagram illustrating a random access procedure according to a second exemplary embodiment of the present invention.

FIG. 9 is a sequence diagram illustrating a random access procedure according to a second exemplary embodiment of the present invention. In the second exemplary embodiment of the present invention, the UE does not know the channel index before receiving the RAR message.

Referring to FIG. 9, a UE 905, having multiple uplink channels available, selects an uplink channel 1 and transmits an RAP to an ENB 910 in step 915. If the RAP is received successfully by the ENB 910 in step 925, the ENB 910 determines an RA-RNTI using Equation (1) in step 930 and generates an RAR message including an uplink channel index in step 935. In step 940, the ENB 910 transmits a PDCCH containing the CRC scrambled by the RA-RNTI and a PDSCH containing the RAR message to the UE 905. The PDCCH is followed by the RAR message. In the mean time, the UE 905, after transmitting the RAP, monitors for reception of PDCCHs in step 920. If PDCCHs are received, the UE 905 performs CRC testing on the PDCCHs using the RA-RNTI and attempts to receive the RAR message in step 945. Using the uplink channel index and RAPID, the UE 905 identifies the RAR message assigned to it by the ENB in step 950 and obtains the resource allocation information in the RAR message. Finally, the UE 905 performs scheduled transmission in step 955 and receives a contention resolution message transmitted by the ENB 910 in step 960 as aforementioned.

Figure 10:
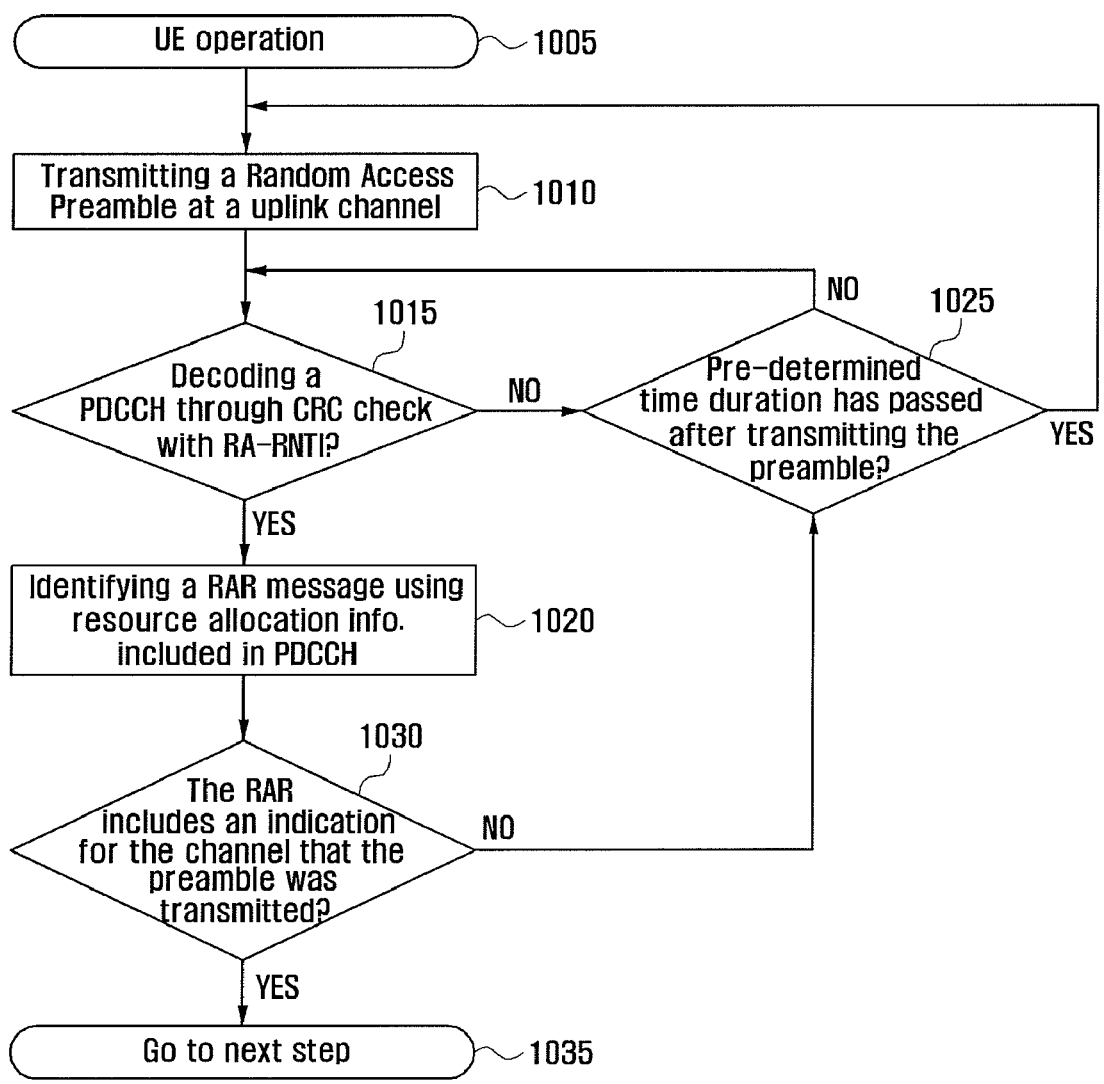
FIG. 10 is a flowchart illustrating a random access procedure at a UE according to the second exemplary embodiment of the present invention.

FIG. 10 is a flowchart illustrating a random access procedure at a UE according to the second exemplary embodiment of the present invention.

Referring to FIG. 10, a UE awakes from a sleep mode or otherwise operates in a state in which it requires to execute a random access procedure in step 1005. The UE transmits an RAP on an uplink channel in step 1010. In step 1015, the UE determines whether a PDCCH is decoded through CRC testing using an RA-RNTI. If a PDCCH is decoded using the RA-RNTI, the UE receives the RAR message transmitted on the resource indicated by the PDCCH in step 1020. Otherwise, if it is determined in step 1015 that no PDCCH is decoded using the RA-RNTI, the UE waits a predetermined time duration and determines whether to repeat transmission of the random access preamble in step 1025. For instance, if three frame times after transmission of the RAP or a specific time window have passed, the UE returns to step 1010 and retransmits the RAP. Otherwise, the UE returns to step 1015 and continues monitoring receipt of PDCCH. Once the RAR message is received successfully, the UE determines in step 1030 whether the RAR message includes an index indicating the uplink channel through which the RAP was transmitted. If the index is not included in the RAR message, this indicates that the RAR message is not assigned to the UE so that the UE proceeds to step 1025 and repeats subsequent steps. On the other hand, if it is determined that the index is included in the RAR message, the UE proceeds to step 1035 and executes appropriate steps, for example contention resolution or resource request.

Figure 11:
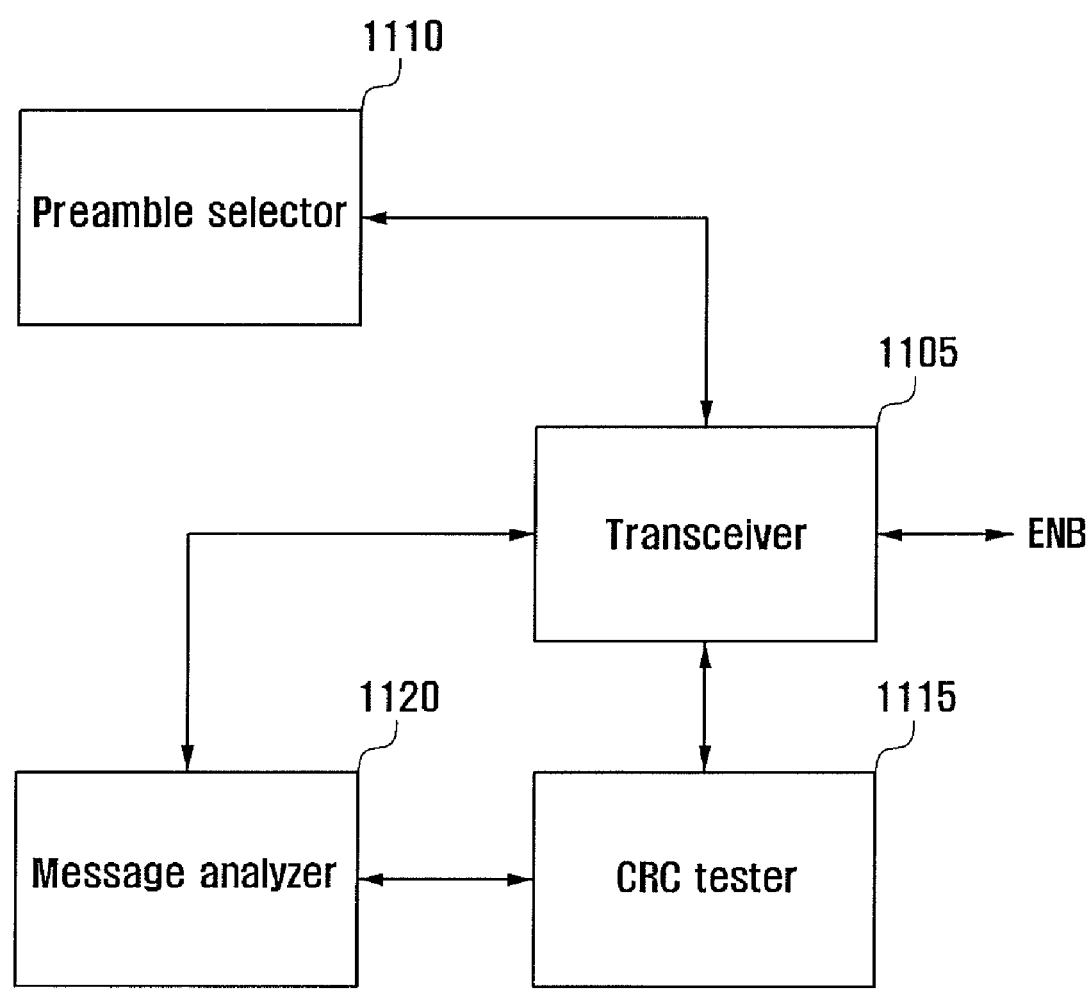
FIG. 11 is a diagram illustrating a configuration of a UE according to the second exemplary embodiment of the present invention.

FIG. 11 is a diagram illustrating a configuration of a UE according to the second exemplary embodiment of the present invention.

Referring to FIG. 11, the UE includes a transceiver 1105, a preamble selector 1110, a CRC tester 1115 and a message analyzer 1120. The structures and functions of the UE of FIG. 11 are substantially identical with those of FIG. 6 except that the CRC test is performed using Equation (1) rather than Equation (2). Moreover, the UE can identify the channel to which the RAP has been transmitted after receipt of the RAR message. Accordingly, the message analyzer 1120 performs a function of determining the channel index when analyzing the RAR message.

Figure 12:
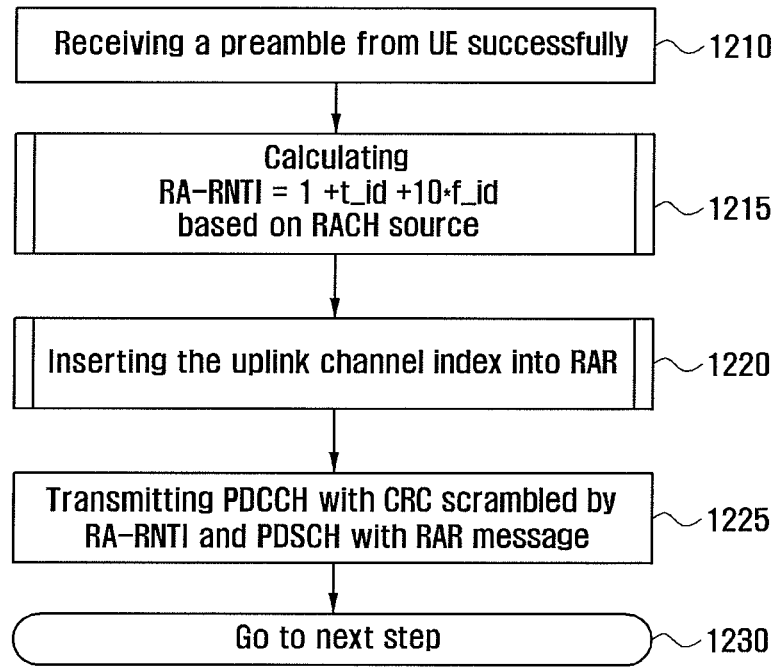
FIG. 12 is a flowchart illustrating a random access procedure at an ENB according to the second exemplary embodiment of the present invention.

FIG. 12 is a flowchart illustrating a random access procedure at an ENB according to the second exemplary embodiment of the present invention.

Referring to FIG. 12, the ENB successfully receives an RAP transmitted by the UE in step 1210. In step 1215, the ENB determines an RA-RNTI using the resource information on which the RAP has been transmitted. Next, the ENB generates an RAR message including the channel index of the uplink channel on which the RAP has been transmitted in step 1220. The ENB transmits a PDCCH having a CRC scrambled by the RA-RNTI which is followed by the RAR message in step 1225. Next, the ENB performs an appropriate next step such as providing resources to the requesting UE in step 1230.

Figure 13:
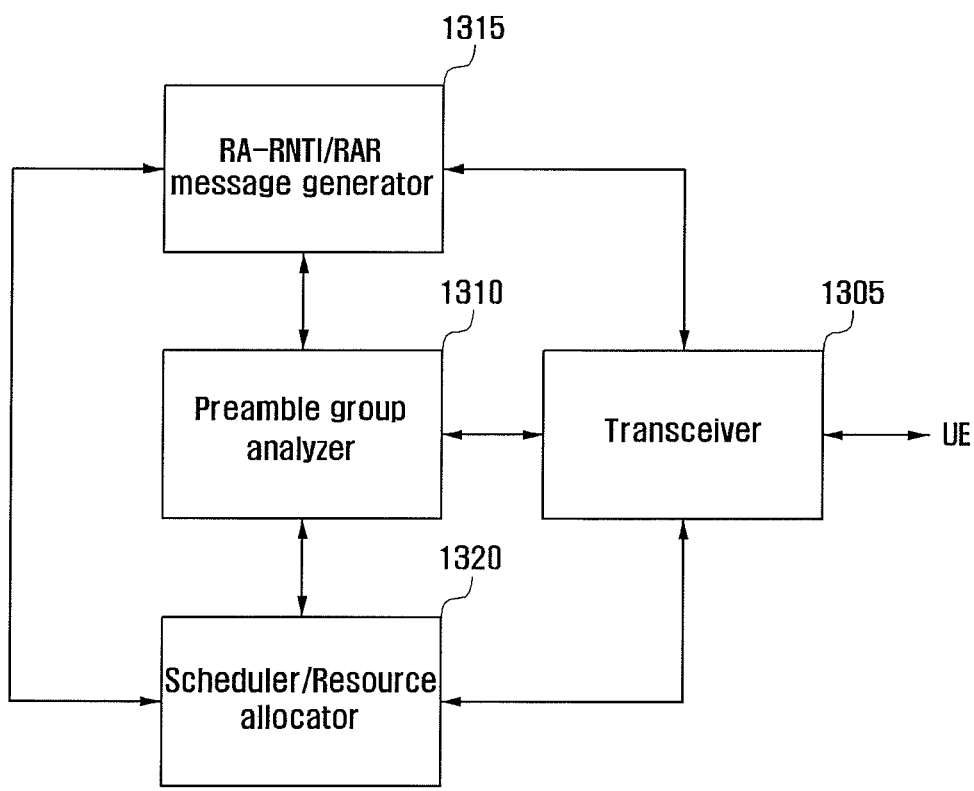
FIG. 13 is a diagram illustrating a configuration of an ENB according to the second exemplary embodiment of the present invention.

FIG. 13 is a diagram illustrating a configuration of an ENB according to the second exemplary embodiment of the present invention.

Referring to FIG. 13, the ENB includes a transceiver 1305, a preamble group analyzer 1310, an RA-RNTI/RAR message generator 1315 and a scheduler/resource allocator 1320. The structures and functions of the ENB of FIG. 13 are substantially the same with those illustrated in FIG. 8 except that the RA-RNTI/RAR message generator 1315 generates an RAR message including the uplink channel index indicating the uplink channel on which the RAP has been transmitted.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for performing random access by a User Equipment (UE), the method comprising:
   transmitting a preamble to a Base Station (BS) on at least one channel of a plurality of channels;
   receiving a response from the BS; and
   distinguishing the response based on an identifier unique to a channel resource to identify the channel in which the preamble is transmitted,
   wherein the identifier is determined based on a product of an uplink channel index indicating a corresponding uplink channel used to transmit the preamble, and a total number of resource elements for the uplink channel,
   wherein the identifier comprises a Random Access-Radio Network Temporary Identifier (RA-RNTI).

2. The method of claim 1, wherein the identifier is determined using a channel resource information used to transmit the preamble.

3. The method of claim 2, wherein the channel resource information comprises an uplink channel index used to transmit the preamble.

4. The method of claim 1, wherein the Random Access-Radio Network Temporary Identifier (RA-RNTI) is determined according to the following equation:

$$RA\text{-}RNTI = 1 + t\_id + 10 * f\_id + N * UL\ CC\_ID,$$

where UL CC_id denotes the uplink channel index indicating the corresponding uplink channel, t_id denotes a time index of a resource element in Physical Random Access Channel (PRACH), f_id denotes a frequency index of a resource element in the PRACH, and N is set to the total number of resource elements for the uplink channel in the PRACH.

5. The method of claim 1, wherein the preamble comprises a Random Access preamble.

6. A method for performing random access by a Base Station (BS), the method comprising:
   receiving a preamble transmitted from a User Equipment (UE) on at least one channel of a plurality of channels;
   generating a response based on an identifier unique to a channel resource for identifying the channel in which the preamble is transmitted; and
   transmitting the response to the UE,
   wherein the identifier is determined based on a product of an uplink channel index indicating a corresponding uplink channel used to transmit the preamble, and a total number of resource elements for the uplink channel,
   wherein the identifier comprises a Random Access-Radio Network Temporary Identifier (RA-RNTI).

7. The method of claim 6, wherein the identifier is determined using a channel resource information used to transmit the preamble.

8. The method of claim 7, wherein the channel resource information comprises an uplink channel index used to transmit the preamble.

9. The method of claim 8, wherein the generating of the response comprises inserting the index into the response.

10. The method of claim 6, wherein the generating of the response comprises scrambling the response by the identifier.

11. The method of claim 6, wherein the Random Access-Radio Network Temporary Identifier (RA-RNTI) is determined according to the following equation:

$$RA\text{-}RNTI = 1 + t\_id + 10 * f\_id + N * UL\ CC\_ID,$$

where UL CC_id denotes the uplink channel index indicating the corresponding uplink channel, t_id denotes a time index of a resource element in Physical Random Access Channel (PRACH), f_id denotes a frequency index of a resource element in the PRACH, and N is set to the total number of resource elements for the uplink channel in the PRACH.

12. An apparatus for performing random access by a User Equipment (UE), the apparatus comprising:
a transceiver for transmitting a preamble to a Base Station (BS) on at least one channel of a plurality of channels, and for receiving a response from the BS; and
a message analyzer for distinguishing the response based on an identifier unique to a channel resource to identify the channel in which the preamble is transmitted,
wherein the identifier is determined based on a product of an uplink channel index indicating a corresponding uplink channel used to transmit the preamble, and a total number of resource elements for the uplink channel,
wherein the identifier comprises a Random Access-Radio Network Temporary Identifier (RA-RNTI).

13. The apparatus of claim 12 wherein the message analyzer determines the identifier using the channel resource information used to transmit the preamble.

14. The apparatus of claim 13, wherein the channel resource information comprises an uplink channel index used to transmit the preamble.

15. The apparatus of claim 12, wherein the Random Access-Radio Network Temporary Identifier (RA-RNTI) is determined according to the following equation:

$$RA\text{-}RNTI = 1 + t\_id + 10 * f\_{id + N * UL\ CC\_}ID,$$

where UL CC_id denotes the uplink channel index indicating the corresponding uplink channel, t_id denotes a time index of a resource element in Physical Random Access Channel (PRACH), f_id denotes a frequency index of a resource element in the PRACH, and N is set to the total number of resource elements for the uplink channel in the PRACH.

16. The apparatus of claim 12, wherein the preamble comprises a Random Access preamble.

17. An apparatus for performing random access by a Base Station (BS), the apparatus comprising:
a transceiver for receiving a preamble transmitted from a User Equipment (UE) on at least one channel of a plurality of channels, and for transmitting a response to the UE; and
a message analyzer for generating the response based on an identifier unique to a channel resource for identifying the channel in which the preamble is transmitted,
wherein the identifier is determined based on a product of an uplink channel index indicating a corresponding uplink channel used to transmit the preamble, and a total number of resource elements for the uplink channel,
wherein the identifier comprises a Random Access-Radio Network Temporary Identifier (RA-RNTI).

18. The apparatus of claim 17, wherein the message analyzer determines the identifier using a channel resource information used to transmit the preamble.

19. The apparatus of claim 18, wherein the channel resource information comprises an uplink channel index used to transmit the preamble.

20. The apparatus of claim 19, wherein the message analyzer generates the response by inserting the index into the response.

21. The apparatus of claim 17, wherein the message analyzer generates the response by scrambling the response by the identifier.

22. The apparatus of claim 17, wherein the Random Access-Radio Network Temporary Identifier (RA-RNTI) is determined according to the following equation:

$$RA\text{-}RNTI = 1 + t\_id + 10 * f\_id + N * UL\ CC\_ID,$$

where UL CC_id denotes the uplink channel index indicating a corresponding uplink channel, t_id denotes a time index of a resource element in Physical Random Access Channel (PRACH), f_id denotes a frequency index of a resource element in the PRACH, and N is set to the total number of resource elements for the uplink channel in the PRACH.

* * * * *